Patented Nov. 25, 1952

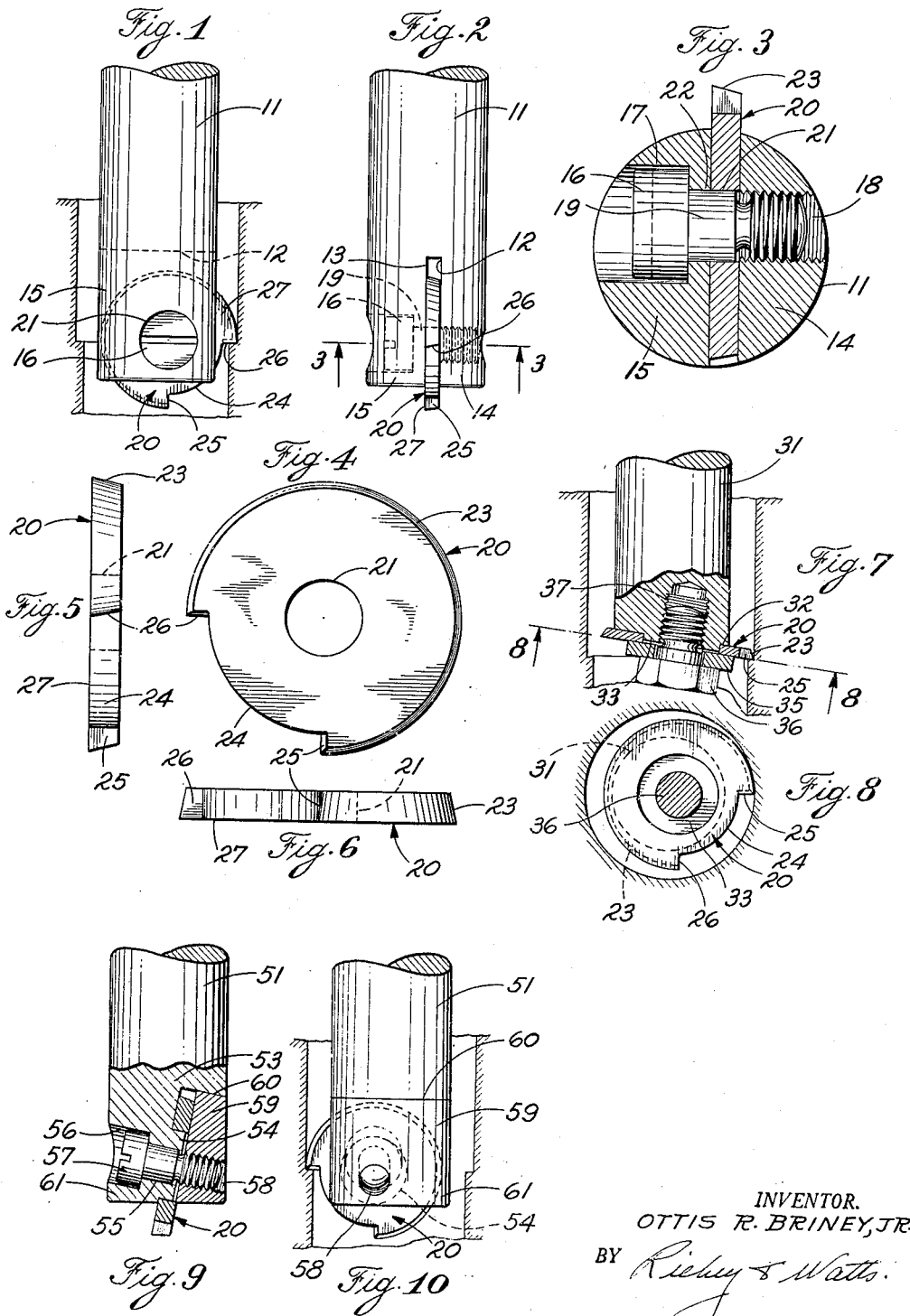

2,618,990

UNITED STATES PATENT OFFICE 2,618,990

BORING BAR AND CUTTER

Ottis R. Briney, Jr., Pontiac, Mich., assignor of one-half to James W. Briney

Application November 4, 1948, Serial No. 58,245

3 Claims. (Cl. 77—58)

This invention relates to metal-working tools, and particularly to improvements in boring bars and cutters therefor. The nature of the invention and the advantages thereof will be clear to those skilled in the art from the appended description of preferred embodiments.

However, by way of introduction, it may be pointed out that the use of boring tools for generating cylindrical internal surfaces of greater or lesser degrees of precision has long been known, and that a great number of structures for mounting the cutter for effecting the boring operation have been proposed.

Notwithstanding the many prior designs of boring bars and cutters, this invention embodies improvements highly beneficial to those engaged in the use of such equipment.

In its preferred form the invention is embodied in a novel cutter, in form generally a disk with a central opening, preferably of one of the presently available extremely hard alloys such as "Carboloy"; in new and improved boring bars especially adapted to accommodate the support of such a cutter so that the tool may be readily adjusted and adequately supported against the stresses initiated by the use of the cutter and supported in proper relation to the work with minimum adjustment of the tool; and in new and useful combinations of the cutters and boring bars.

The principal objects of the invention are to improve the art of boring; to devise a cutting tool which is adapted to utilize to best advantage the valuable properties of extremely hard but brittle cutting alloys; to provide a cutter and supporting structure which is simple in form, economic of production, sturdy of structure, and readily adjustable; to provide a cutter which is readily adaptable for use in boring a variety of metals; and to provide a cutter that may be readily resharpened.

Other objects and advantages of the invention and the manner in which the objects are achieved will be apparent to those skilled in the art from the appended specification and the accompanying drawings in which:

Figs. 1 and 2 are elevational views of the end portion of a boring bar and cutter assembly;

Fig. 3 is an enlarged cross-sectional view of the tool shown in Fig. 2, the section being taken on a plane indicated by the line 3—3 in Fig. 2;

Fig. 4 is an enlarged plan view of the rearward face of the cutter;

Figs. 5 and 6 are side elevational views of the cutter;

Fig. 7 is an elevational view of a modified form of the boring bar partially shown in section with the cutter in place;

Fig. 8 is a transverse sectional view of the same taken on a plane indicated by the line 8—8 in Fig. 7;

Fig. 9 is a vertical sectional view of a fragmentary portion of a boring bar of a still further modified form; and Fig. 10 is a side elevational view thereof.

Referring first to Figs. 1 to 3, the boring bar 11 may be formed with a shank of any suitable form to accommodate the support thereof in the spindle of a boring machine, the turret head of a screw machine, or the like. The end of the bar is formed with a slot 12, the face 13 thereof being disposed in a plane passing through the medial axis of the bar. A cutter 20 is retained between the two furcations 14 and 15 of the bar, the thickness of the cutter being substantially equal to the width of the slot. The cutter 20, as will be seen in Fig. 4, comprises a disk formed with flat faces having a central circular opening 21 therein. The cutter is retained in operative position by a screw 16, the head thereof being seated in a counterbore 17 in the furcation 15, the threaded shank being engaged in a tapped opening 18 in the furcation 14. The screw 16 is formed with a pilot bearing 19 adjacent the head thereof which is proportioned to snugly engage the opening 21 in the cutter and the bore 22 in the boring bar, thus positively locating the cutting disk and preventing vibration thereof. The cutter 20 is clamped between the furcations 14 and 15 by tightening the screw 16, which may be formed with a screwdriver slot, as shown, or for the application of an Allen wrench or similar tool.

As will be seen most clearly in Figs. 4 to 6, the cutter 20 is formed with a slightly conical or tapered face 23 extending around the greater portion of its circumference concentric with the central opening 21. The conical form of the face 23 provides the cutting clearance for the cutter. The cutting edge of the tool is formed by grinding or otherwise reducing the diameter of the cutter through about one-fourth of its circumference, as indicated by the notch 24, which terminates in substantially radial faces 25 and 26. The face 27 of the disk is presented to the work in the arrangement illustrated in Figs. 1 to 3, the cutting edge being defined by the intersection of the surface 26 with the face 27. The surface 26 is beveled to provide an end-cutting clearance angle and the conical form of the edge 23 of the disk forms a relief cutting angle in the cutter.

For boring operations, the disk is mounted on the bar 11 with the face 26 disposed in transaxial relation to the bar. The screw 16 is mounted slightly off-center in the bar so that the cutting edge 26 of the cutter projects from the bar and the diametrically opposite portion of the cutter is supported in the slot 12 where it is protected and disposed in remote relation to the adjacent side wall opening in the work. The diameter of the cut may be varied by adjusting the cutter 20, which may be slightly rotated about its axis to increase or decrease its projection from the slot 12.

The boring bar 11, slotted as illustrated in Figs. 1 to 3 provides no back or side rake for the tool. Where rake is desired, the angle of the face defined by the slot 12 may be modified, as will be pointed out hereafter.

When the screw 16 is tightened, the furcations 14 and 15 are drawn against the major portion of both faces of the disk 20 so that is held rigidly, but without deleterious stress. Since only a small portion of the disk projects from the bar, the cutter is of adequate strength to withstand the strains imposed thereon during boring operations. From the foregoing it will be seen that the invention provides a cutter of simple form which need not be brazed or otherwise united with the holder, but which nevertheless is so constructed and supported as to be rigid, strong, and rugged.

The invention is thus particularly adapted for use in tooling operations that require particularly hard cutting alloys which have the well-known advantage of being able to retain an edge and to withstand rapid speeds and feed, but which are extremely hard and brittle, for example, the alloy known by the trade-mark "Carboloy."

A cutter of the form illustrated in Fig. 4 may be readily fabricated to approximately its ultimate shape so that no finishing other than the grinding or dressing of the faces 23, 25 and 26 is necessary before the cutter is ready for use. When the cutting edges become dull, the face 25 or 26 may be ground in a direction circumferentially of the disk, and, as will be apparent, these faces may be repeatedly ground until substantially three-fourths of the circumference of the disk has been used. For this reason the useful life of the cutters is much greater than that of a prismoidal tool bit.

A second form of boring bar which, for some purposes, will be found to be more suitable than that previously described, is illustrated in Figs. 7 and 8 in which the boring bar 31, the shank of which is omitted from the figure, is formed with a slightly oblique end face 32 having a boss or pilot bearing 33 thereon. The boss is of cylindrical form, with the axis thereof perpendicular to the face 32 but slightly eccentric to the medial axis of the bar. The boss 33 is formed for snug engagement with the opening in the cutter 20 which is mounted on the boss and engaged with the face 32 of the boring bar, the larger face 27 of the disk being outward. The thickness of the cutter is slightly greater than the height of the boss 33. As an alternate construction the end of the bar may be counterbored circumambient the hole 37 for the reception of a ring dowel engageable with the opening in the cutter, or, if desired, the end surface of the bar may be left flat and the cutter supported on the shank of the screw which in turn is piloted in a counterbore in the hole 37 similar to the structure illustrated in Fig. 3.

The eccentric mounting of the cutter 20 is desirable for two reasons. First, it provides a side cutting relief angle for the tool in the bore and second, it provides for adjustment of the cutting radius by rotation of the tool relative to the bar 31. With a circular disk the tool may be sharpened without changing the radius, and, if replaced in the same position as previously used, will cut to the same depth. The inclined mounting of the cutter resulting from the obliquity of the end 32 of the bar provides the rake for the cutter and the tapered edge 23 of the disk provides the side-cutting clearance. The cutting edge is defined by the junction of the face 25 and the outer edge 23 of the cutter 20 and the face 25 may be ground to the suitable angle for the material being machined, to provide the desired cutting angle.

It will be apparent that with the tool positioned so that the cutting edge extends farther from the center of the boring bar than any other part of the tool the cutter will have clearance in the bore even if the bar is approximately concentric with the bore and the bore is only slightly larger than the cutter. Thus, with the construction illustrated in Figs. 7 and 8, it is possible to bore a hole which is but slightly larger than the diameter of the disk 20.

The device of Figs. 7 and 8 shares the advantages of the previously described form in that it supports the cutter rigidly by virtue of the large abutting area of the bar and washer so that the outboard portion of the cutter is strong and relatively short. The cutter 20 may be used interchangeably in either form of the boring bar, the reduced portion 24 serving to define both the cutting face 26 for use in the combination of Fig. 1 and the cutting face 25 used in the combination of Fig. 7.

One advantage of the form of Fig. 7 is that the rake of the tool may be varied by grinding the cutting face 25, whereas in the form of Fig. 1 the plane of the cutting face of the tool is fixed by the position of the slot 12.

By varying the position of the slot 12 both side and back rake angles, either negative or positive, may be modified to improve the performance of the tool on any particular material. This principle is illustrated in Fig. 9 which shows an arrangement providing a positive rake angle for the tool and, in addition, a further modification of the cutter-clamping structure. The boring bar 51 illustrated in Fig. 9 is milled in the end portion thereof to provide a face 52 corresponding to the surface 13 of Fig. 1 but inclined to the axis of the bar. The cutting tool 20 may be mounted on a boss 54 constituting a pilot bearing 53 or may be snugly engaged with the shank of the screw 57. The height of the boss is slightly less than the thickness of the cutter. The bar is formed with a cross bore 55 and a counterbore 56 for the reception of the clamping screw 57 which is provided with a cylindrical shank adjacent the head similar to the bearing 19 in the screw 16 in Fig. 1. The shank of the screw may be loosely engaged in the bore 55 when the bar is formed with the boss 54, but is preferably tightly engaged with the bore in the bar and the opening in the cutter when the boss 55 is omitted. The screw 57 is threaded to cooperate with a tapped opening 58 in a nut 59, the outer surface of which is cylindrical to conform to the contour of the bar 51 and the inner surface of which is flat and adapted for engagement with the flat surface of the disk 20. Rotation of the nut 59 is restrained by the engagement of the flat end wall 60 therein with the straight shoulder in the end of the notched portion of the bar. The cutter may be mounted in the bar by backing off the screw 57, fitting the cutter over the boss 54, then tightening the screw 57 the cutter being retained in a position similar to that illustrated in Figs. 1 to 3. It will be apparent that the inclination of the surface provides a rake for the cutting face of the tool and may call for corresponding modification of the angle of the face 25 to provide the desired clearance.

The boss 54 may be eliminated and the pilot bearing 19 may be substituted therefor. It will be apparent that the nut 59, as illustrated in Fig. 9, may be eliminated by forming a tapped opening in the depending end portion 61 of the bar. It is further apparent that the opening 21 in the cutter may be formed eccentric to the center of the disk to accommodate a wider range of adjustment of the tool.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A boring tool comprising a bar having a slot parallel to the axis thereof and a bore in the end portion thereof intersecting said slot, a screw in said bore, a hard alloy cutter disk supported on said bar by said screw, said disk having a central opening therein, a radially reduced segment in the circumferential edge thereof, a beveled edge in the remaining circumferential portion of the disk defining a frusto-conical body, beveled radial shoulders in the disk at the ends of said reduced segment constituting cutting edges, the diameter of the disk being slightly larger than the diameter of the bar and the bore in the bar being disposed in offset relation to the medial axes thereof whereby the shouldered portions of the disk will overhang the periphery of the bar and the remaining portion of the disk will be enveloped within and clamped by the bar.

2. A boring tool comprising a bar having a slot parallel to the axis thereof and a cross-bore in the free end of the bar intersecting the slot, a hard alloy cutter disk having a central opening therein in said slot, a clamping screw in said cross-bore and through the opening in the disk, a segment of a shorter radius in the circumferential edge of said disk, a beveled edge on the remaining circumferential edge of said disk defining a truncated conical body, a beveled radial shoulder in one end of said segment forming a cutting edge, the screw being disposed in offset relation to the medial axis of the bar and the disk being proportioned relative to the diameter of the bar so that the shouldered portions of the disk will protrude beyond the walls of the bar and the remaining portions of the disk will be enveloped and clamped by the walls defining the slot in the bar.

3. A boring tool comprising a bar having a slot parallel to the axis thereof and a bore in the end portion of the bar intersecting said slot, a screw in said bore, a hard alloy disk cutter having a central opening therein supported on said bar by said screw, beveled radial shoulders in said disk constituting the rake-cutting edge in said disk cutter, a beveled circhmferential edge in the disk between the shoulders constituting the clearance in said disk cutter, said screw being mounted in eccentric relation to the medial axes of the bar positioning the shouldered portions of the disk in outboard relation with the peripheral walls of the bar, and the major portion of the beveled circumferential edge of the disk being clamped and enveloped within the side walls of the bar.

OTTIS R. BRINEY, JR.

REFERENCES CITED

The following references are of record in the file of this patent:

UNITED STATES PATENTS

| Number | Name | Date |
|---|---|---|
| 318,994 | Lake | June 2, 1885 |
| 528,787 | Nelson | Nov. 6, 1894 |
| 969,983 | Rosenbeck | Sept. 13, 1910 |
| 1,052,400 | Baker | Feb. 4, 1913 |
| 2,383,958 | DeVlieg | Sept. 4, 1945 |

FOREIGN PATENTS

| Number | Country | Date |
|---|---|---|
| 543,632 | Great Britain | Mar. 5, 1942 |
| 589,514 | Great Britain | June 23, 1947 |

OTHER REFERENCES

American Machinist Magazine, page 280, Mar. 3, 1904.